United States Patent [19]

Tazaki et al.

[11] Patent Number: 5,739,225
[45] Date of Patent: Apr. 14, 1998

[54] PROCESS FOR PREPARING OLEFIN POLYMER, AND ETHYLENIC POLYMER

[75] Inventors: Toshinori Tazaki; Shuji Machida; Nobuo Kawasaki; Nobuhiro Yabunouchi; Yasunori Kadoi; Mizutomo Takeuchi; Kenji Nakacho; Haruo Shikuma; Noriyuki Tani, all of Sodegaura, Japan

[73] Assignee: Idemitsu Kosan Co., Ltd., Tokyo, Japan

[21] Appl. No.: 666,471

[22] PCT Filed: Dec. 27, 1994

[86] PCT No.: PCT/JP94/02251

§ 371 Date: Jun. 28, 1996

§ 102(e) Date: Jun. 28, 1996

[87] PCT Pub. No.: WO95/18158

PCT Pub. Date: Jul. 6, 1995

[30] Foreign Application Priority Data

| Dec. 28, 1993 | [JP] | Japan | 5-334403 |
| Apr. 14, 1994 | [JP] | Japan | 6-075691 |
| Jul. 25, 1994 | [JP] | Japan | 6-172643 |

[51] Int. Cl.$^6$ ............................................. C08F 4/64
[52] U.S. Cl. ............ 526/127; 526/160; 526/161; 526/169.1; 526/169.2; 526/282; 526/335; 526/336; 526/340; 526/348.2; 526/348.3; 526/348.4; 526/348.5; 526/348.6; 526/943; 502/117; 502/155
[58] Field of Search ...................... 526/127, 160, 526/161, 169.1, 169.2, 282, 335, 336, 340, 348.2, 348.3, 348.4, 348.5, 348.6, 943

[56] References Cited

U.S. PATENT DOCUMENTS 5,444,134 8/1995 Matsumoto .................. 526/159

FOREIGN PATENT DOCUMENTS 0 476 671 3/1992 European Pat. Off. .
WO 88/10275 12/1988 WIPO .

OTHER PUBLICATIONS

Soga et al, "Recent Development In Stereochemical Control Of Heterogeneous Ziegler–Natta Catalysts", Makromolekulare Chemie, Macromolecular Symposia, vol. 63, Oct. 1, 1992, pp. 219–231.

Chein et al, "Metallocene–Methylaluminoxane Catalysts for Olefin Polymerization. V. comparsion of $Cp_2ZrCl_2$ and $CpZrCl_3$," Journal of Polymer Science, Polymer Chemistry Edition, vol. 28, No. 1, Jan. 15, 1990, pp. 15–38.

Primary Examiner—David W. Wu
Attorney, Agent, or Firm—Oblon, Spivak, McClelland, Maier & Neustadt, P.C.

[57] ABSTRACT

An olefin polymer is prepared by homopolymerizing an olefin or copolymerizing two different olefins or an olefin and another polymerizable unsaturated compound in the presence of a polymerization catalyst containing (A) a transition metal compound represented by the formula (I):

$$CpML_{x-1} \qquad (I)$$

wherein M is a metallic element of Groups 3 to 10 of the Periodic Table or a metallic element of the lanthanide series; Cp is a cyclic compound group having a cyclopentadienyl skeleton of 5 to 30 carbon atoms; L is R', OR', SR', $SO_3R'$,NR'R", PR'R", wherein R' and R" are each a $C_{1-20}$ hydrocarbon group or a silyl group, $NO_2$, a halogen atom, a 1-pyrrolyl group or a 1-pyrrolidinyl group, with the proviso that at least one of the L groups is OR', SR', NR'R" or PR'R", wherein R' and R" are each a $C_{1-20}$ hydrocarbon group or a silyl group; and x is a valence number of M, and when a plurality of L's are present, the respective L's may be the same or different, and (B) an aluminoxane, wherein the molar ratio of the component (B)/component (A) (in terms of the metallic atoms) is in the range of 2 to 500.

11 Claims, 2 Drawing Sheets

PROCESS FOR PREPARING OLEFIN POLYMER, AND ETHYLENIC POLYMER

TECHNICAL FIELD

The present invention relates to a novel process for preparing an olefin polymer, and an ethylenic polymer. More specifically, the present invention relates to a process for preparing an olefin homopolymer or an olefin copolymer very economically advantageously in which even if the amount of an expensive aluminum compound as a promotor is small, the homopolymerization or the copolymerization of an olefin can be carried out by the use of a polymerization catalyst having a high activity and an excellent copolymerizability to permit the omission of deashing and washing steps and to reduce the influence of the remaining catalyst on product quality and in which when the copolymerization is carried out, the conversion of a comonomer is high, and hence, after the completion of the polymerization, the collection of the comonomer component is unnecessary or the comonomer can be removed in a simple manner. In addition, the present invention also relates to an ethylenic polymer having high melt flow properties, an excellent molding stability (swell ratio), good mechanical properties (such as tearing strength), good heat-sealing properties and a good ESCR (environmental stress crack resistance).

BACKGROUND ART

Heretofore, an olefin polymer such as a polyethylene or an ethylene-α-olefin copolymer has been manufactured in the presence of a transition metal catalyst such as a titanium catalyst comprising a titanium compound and an organic aluminum compound, or a vanadium catalyst comprising a vanadium compound and the organic aluminum compound.

In recent years, as examples of such a transition metal catalyst, there have newly been suggested many zirconium catalysts each comprising a zirconium compound and an aluminoxane by which ethylene can be copolymerized with an α-olefin under a high polymerization activity. However, such zirconium catalysts have a drawback that a large amount of the expensive aluminoxane must be used.

On the other hand, with regard to the polyethylene or the ethylene-α-olefin copolymer, its primary structure has heretofore been controlled by adjusting a molecular weight, a molecular weight distribution or copolymerization properties (random properties, a blocking tendency and a composition distribution), or by adding a third component such as a diene so as to introduce branches.

For ethylenic polymers, various molding methods are usable, and typical known examples of the molding methods include injection molding, extrusion, blow molding, inflation, compression molding and vacuum forming. In such molding methods, the impartment of high-speed molding properties and the reduction of molding energy have been investigated for a long period of time in order to improve working properties and to thus lower a working cost, and so it is an important theme that optimum physical properties suitable for each use are imparted and the molding can be carried out with the optimum working properties.

In recent years, it has been elucidated that a uniform metallocene catalyst is excellent in the copolymerization properties between olefins, can obtain a polymer having a narrow molecular weight distribution, and has a much higher catalytic activity as compared with a conventional Vanadium catalyst. Therefore, it has been expected that the metallocene catalyst will be developed in various technical fields by the utilization of such characteristics. However, a polyolefin obtained by the use of the metallocene catalyst is poor in molding and working properties, and for this reason, the application of the metallocene catalyst to the blow molding and the inflation is unavoidably limited.

Thus, various olefin polymers, into which longchain branches are introduced in order to solve such problems, have been disclosed. For example, there have been disclosed (1) an olefin copolymer having the long-chain branches obtained by the use of an α,ω-diene or a cyclic endomethylenic diene (Japanese Patent Application Laid-open No. 34981/1972), (2) a process for preparing a copolymer containing a higher non-conjugated diene content in a high-molecular weight segment than in a low-molecular weight segment which comprises carrying out polymerization in two steps to copolymerize the non-conjugated diene with an olefin (Japanese Patent Application Laid-open No. 56412/1984), (3) an ethylene-α-olefin-1,5-hexadiene copolymer obtained by the use of a metallocene-aluminoxane catalyst (Japanese Patent Application PCT-through Laid-open No. 501555/1989), (4) a process for introducing the long-chain branches by copolymerizing an α,ω-diene and ethylene in the presence of a catalyst comprising a zero-valent or a divalent nickel compound and a specific aminobis(imino) compound (Japanese Patent Application Laid-open No. 261809/1990), and (5) a polyethylene containing both of the short-chain branches and the long-chain branches which can be obtained by polymerizing ethylene alone by the use of the same catalytic component as in the above-mentioned (4) (Japanese Patent Application Laid-open No. 277610/1991).

However, in the copolymer of the above-mentioned (1), a crosslinking reaction takes place simultaneously with the formation of the long-chain branches by the diene component, and at the time of the formation of a film, a gel is generated. In addition, melt properties inversely deteriorate, and a control range is extremely narrow. Moreover, there is a problem that copolymerization reactivity is low, so that low-molecular weight polymers are produced, which leads to the deterioration of physical properties inconveniently. In the preparation process of the copolymer described in the aforesaid (2), the long-chain branches are introduced into the high-molecular weight component, so that the molecular weight noticeably increases due to crosslinking, and thus insolubilization, nonfusion or gelation might inconveniently occur. Furthermore, the control range is narrow, and the copolymerization reactivity is also low, and hence, there is a problem that owing to the production of the low-molecular weight polymers, the physical properties deteriorate inconveniently. In the copolymer of the above-mentioned (3), molecular weight distribution is narrow, and for this reason, the copolymer is unsuitable for blow molding and film formation. In addition, since branch points are formed by the progress of the cyclizing reaction of 1,5-hexadiene, an effective monomer concentration is inconveniently low. In the process for introducing the long-chain branches described in the above-mentioned (4), there is a problem that a range for controlling the generation of a gel and the physical properties is limited. In addition, the polyethylene of the above-mentioned (5) is a polymer which contains neither ethyl branches nor butyl branches, and therefore the control of the physical properties, for example, the control of density is accomplished by methyl branches, so that the physical properties of the polyethylene tend to deteriorate.

Furthermore, there has been disclosed a method for preparing an ethylenic polymer to which working properties are imparted by the utilization of copolymerization, for example, a method which comprises forming a polymer ([η]=10–20 dl/g) by preliminary polymerization, and then preparing an ethylene-α-olefin copolymer by main polymerization (Japanese Patent Application Laid-open No. 55410/1992). This method has an effect that melt tension can be increased by changing the melt properties of the obtained copolymer, but it has a drawback that a film gel tends to occur.

In addition, there have been disclosed ethylenic polymers obtained in the presence of a metallocene catalyst and methods for preparing the same, for example, (1) a method for preparing an ethylenic polymer in the presence of a constrained geometrical catalyst and an ethylenic copolymer obtained by this method (Japanese Patent Application Laid-open No. 163088/1991 and WO93/08221), (2) a method for preparing a polyolefin in the presence of a metallocene catalyst containing a porous inorganic oxide (an aluminum compound) as a carrier (Japanese Patent Application Laid-open No. 100808/1992), and (3) an ethylene-α-olefin copolymer which can be derived from ethylene and the α-olefin in the presence of a specific hafnium catalyst and which has a narrow molecular weight distribution and improved melt flow properties (Japanese Patent Application Laid-open No. 276807/1990).

However, in the technique of the above-mentioned (1), the obtained ethylenic copolymer has a narrow molecular weight distribution and a narrow composition distribution, and both of these disadvantages cannot separately be controlled. Furthermore, there is a description that in this ethylenic copolymer, long-chain branches are present and so the ethylenic copolymer is excellent in working properties, i.e., melt flow properties, but these properties are still poor. In addition, there is no concrete description regarding other important working properties, above all, molding stabilities (a swell ratio, melt tension and the like).

According to the preparation method of the above-mentioned (2), the obtained copolymer of ethylene and the α-olefin has a large die swell ratio, but in view of the relation of the die swell ratio to the melting point of the ethylene-1-butene copolymer disclosed herein, it is apparent that the die swell ratio deteriorates with an increase in the melting point. Therefore, any copolymer cannot be provided in which the die swell ratio regarding a neck-in which is a trouble at the time of the formation of a film or a sheet is controllable in a wide melting point range.

On the other hand, the copolymer disclosed in the above-mentioned (3) contains an α-olefin unit as an essential unit, and it does not cover any copolymer having a resin density of more than 0.92 g/cm$^3$. Additionally, as in the above-mentioned (1), the copolymer has a narrow molecular weight distribution and a narrow composition distribution, and both of these disadvantages cannot separately be controlled.

In the ethylenic copolymer obtained by the use of the metallocene catalyst, the molecular weight distribution is narrow and thus the composition distribution is also narrow as described above, so that highly branched low-molecular weight moieties are small and hence the improvement of heat-sealing properties and ESCR can be expected. Furthermore, mechanical properties such as film impact can also be improved, but tearing strength inversely deteriorates. In addition, the ethylenic copolymer has a high uniformity, and for this reason, the transparency of the film is considered to be excellent.

On the other hand, the ethylenic copolymer obtained by the use of a conventional heterogeneous catalyst has a wide molecular weight distribution and a wide composition distribution. Particularly in the ethylenic copolymer, the highly branched low-molecular weight moieties are formed as by-products, and therefore the heat-sealing properties and ESCR tend to deteriorate, but the tearing strength is advantageously excellent.

As described above, the molecular weight distribution and the composition distribution have an extremely large influence on a resin performance, and the ethylenic copolymers in which these factors have optionally been controlled can suitably be used in various application fields.

DISCLOSURE OF THE INVENTION

An object of the present invention is to provide a process for preparing an olefin polymer economically advantageously in which even if the amount of an expensive aluminum compound as a promotor is small, the homopolymerization or the copolymerization of an olefin can be carried out in the presence of a polymerization catalyst having a high activity and an excellent copolymerizability to permit the omission of deashing and washing steps and to reduce the influence of the remaining catalyst on a product quality and in which when the copolymerization is carried out, the conversion of a comonomer is high, and hence, after the completion of the polymerization, the collection of the comonomer component is unnecessary or the comonomer can be removed in a simple manner. Another object of the present invention is to provide an ethylenic polymer having high melt flow properties, an excellent molding stability (swell ratio), good mechanical properties (such as tearing strength), good heat-sealing properties and a good ESCR.

The present inventors have researched with the intention of establishing a polymerization technique which can control the activation energy of melt flow in an olefin polymer, particularly an ethylenic polymer, i.e., a polymerization technique which can provide the polymer having excellent working properties and which can control physical properties such as density, melting point and crystallinity, and various suggestions have already been made.

The present inventors have further advanced the research, and as a result, it has been found that a polymerization catalyst which contains a specific transition metal compound and an aluminum oxycompound and in which the ratio of the aluminum oxycompound to the transition metal compound is within a lower specific range than in a conventional catalytic system has a high activity and an excellent copolymerizability, and it has also been found that when an olefin is homopolymerized or when two or more kinds of olefins are copolymerized or an olefin is copolymerized with another polymerizable unsaturated compound in the presence of this polymerization catalyst, an olefin polymer can be prepared very economically advantageously.

In addition, it has been found that an ethylenic polymer which is obtained by the homopolymerization of ethylene or the copolymerization of ethylene and at least one selected from the group consisting of other olefins and polymerizable unsaturated compounds and which has a molecular weight distribution, a molecular weight, the activation energy of melt flow and a resin density within specific ranges and which possesses a specific composition distribution has high melt flow properties, an excellent molding stability (swell ratio), good mechanical properties (such as tearing strength), good heat-sealing properties and a good ESCR. In consequence, the present invention has been completed on the basis of such findings.

That is to say, the present inventions are directed to (1) a process for preparing an olefin polymer which comprises the step of homopolymerizing an olefin or copolymerizing two kinds of olefins, or an olefin and another polymerizable unsaturated compound in the presence of a polymerization catalyst containing (A) a transition metal compound represented by the general formula (I)

$$CpML_{x-1} \quad (I)$$

wherein M is a metallic element of Groups 3 to 10 of the Periodic Table or a metal of the lanthanoid series; Cp is a cyclic compound group having a cyclopentadienyl skeleton or a substituted cyclopentadienyl skeleton and 5 to 30 carbon atoms; L is a σ ligand; and x is a valence number of M, and when a plurality of L's are present, the respective L's may be the same or different,
and (B) an aluminum oxycompound in such a ratio that the molar ratio of the component (B)/the component (A) (in terms of a metallic atom) may be in the range of 2 to 500, and (2) an ethylenic polymer which comprises a homopolymer of ethylene or a copolymer of ethylene and at least one selected from the group consisting of other olefins and polymerizable unsaturated compounds; in said ethylenic polymer, (i) a ratio Mw/Mn of a weight-average molecular weight (Mw) to a number-average molecular weight (Mn) in terms of a polyethylene measured by a gel permeation chromatography being within the range of 1.5 to 4, the weight-average molecular weight (Mw) being within the range of 3,000 to 1,000,000; (ii) a relation between a half value width [W (°C.)] of the main peak of a composition distribution curve obtained by a temperature rising elution fractionation and a temperature position [T (°C.)] of the main peak meeting the equation $$W \geq -24.9 + 2470/T,$$

(iii) an activation energy (Ea) of melt flow being within the range of 7.5 to 20 kcal/mol, (iv) a resin density (d) being within the range of 0.85 to 0.97 g/cm³.

Furthermore, preferred embodiments for carrying out the present invention are directed to (3) the process of the above-mentioned (1) wherein the σ ligand is R', OR', SR', SO₃R', N'R'R", PR'R" (wherein R' and R" are each a hydrocarbon group having 1 to 20 carbon atoms or a silyl group), NO₂, a halogen atom, a 1-pyrrolyl group or a 1-pyrrolidinyl group, (4) the process of the above-mentioned (1) wherein at least one of the σ ligands is OR', SR', N'R'R" or PR'R" (wherein R' and R" are the same as defined above), (5) the process of the above-mentioned (1) wherein the component (B) is mainly an alkylaluminoxane, (6) the process of the above-mentioned (1) wherein the polymerization catalyst is a catalyst obtained by supporting at least one of catalytic components onto a solid carrier which is insoluble in a hydrocarbon solvent, (7) the ethylenic polymer of the above-mentioned (2) wherein at least one selected from the group consisting of other olefins and polymerizable unsaturated compounds is at least one selected from the group consisting of α-olefins having 3 to 20 carbon atoms, aromatic vinyl compounds, cyclic olefins and diolefins, (8) the ethylenic polymer of the above-mentioned (2) wherein at least one selected from the group consisting of other olefins and polymerizable unsaturated compounds is at least one selected from the group consisting of α-olefins having 3 to 20 carbon atoms and diolefins, and a relation between a weight-average molecular weight (Mw) and a die swell ratio ($D_R$) meets the equation $$D_R > 0.50 + 0.125 \times \log Mw, \text{ and}$$

(9) the ethylenic polymer of the above-mentioned (2) obtained by the process of any one of the above-mentioned (1) and (3) to (6).

In the present invention, the expression of "polymerization" or "polymer" means not only homopolymerization or homopolymer but also copolymerization or copolymer, respectively.

BEST MODE FOR CARRYING OUT THE INVENTION

Figure 1:
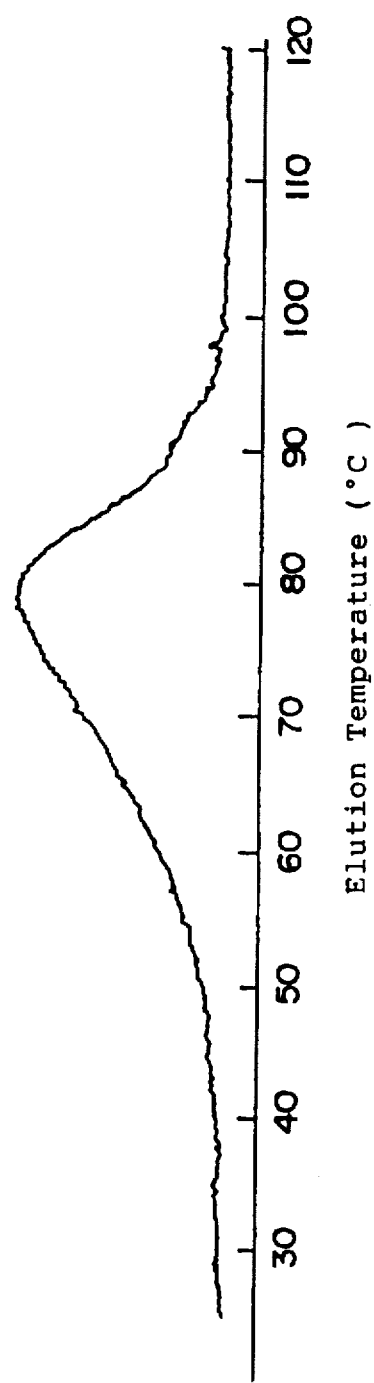
FIG. 1 is a composition distribution curve of an ethylene/1-octene copolymer obtained in Example 30.

In a preparation process of an olefin polymer according to the present invention, there is carried out the homopolymerization of an olefin, the copolymerization of two or more kinds of olefins, or the copolymerization of an olefin and another polymerizable unsaturated compound in the presence of a polymerization catalyst.

No particular restriction is put on the kinds of olefins, and examples of the olefins include α-olefins such as ethylene, propylene, 1-butene, 1-pentene, 1-hexene, 1-heptene, 1-octene, 1-nonene, 1-decene, 4-phenylbutene-1, 6-phenylhexene-1, 3-methylbutene-1, 4-methylpentene-1, 3-methylpentene-1, 3-methylhexene-1, 4-methylhexene-1, 5-methylhexene-1, 3,3-dimethylpentene-1, 3,4-dimethylpentene-1, 4,4-dimethylpentene-1, 3,5,5-trimethylhexene-1 and vinylcyclohexane, and halogen-substituted α-olefins such as hexafluoropropene, tetrafluoroethylene, 2-fluoropropene, fluoroethylene, 1,1-difluoroethylene, 3-fluoropropene, trifluoroethylene and 3,4-dichlorobutene-1.

In the present invention, one kind of compound may be selected from these olefins and then homopolymerized, or two or more kinds of compounds may be selected therefrom and then copolymerized.

Furthermore, examples of the other polymerizable unsaturated compounds which can be copolymerized with the olefin in the present invention include cyclic olefins, cyclic diolefins, chain conjugated diolefins, chain non-conjugated diolefins, aromatic vinyl compounds, unsaturated esters, lactones, lactams and epoxides.

Examples of the cyclic olefins include cyclopentene, cyclohexene, norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene and 5-benzylnorbornene, and examples of the cyclic diolefins include 5-ethylidenenorbornene, 5-vinylnorbornene, dicyclopentadiene and norbornadiene.

Examples of the chain conjugated diolefins include 1,3-butadiene and isoprene, and examples of the chain non-conjugated diolefins include 1,4-dienes such as 1,4-hexadiene, 4-methyl-1,4-hexadiene, 5-methyl-1,4-hexadiene and 5-methyl-1,4-heptadiene, 1,5-dienes such as 1,5-hexadiene, 3-methyl-1,5-hexadiene, 3-ethyl-1,5-hexadiene, 3,4-dimethyl-1,5-hexadiene, 1,5-heptadiene, 5-methyl-1,5-heptadiene, 6-methyl-1,5-heptadiene, 1,5-octadiene, 5-methyl-1,5-octadiene and 6-methyl-1,5-octadiene, 1,6-dienes such as 1,6-octadiene, 6-methyl-1,6-octadiene, 7-methyl-1,6-octadiene, 7-ethyl-1,6-octadiene, 1,6- nonadiene, 7-methyl-1,6-nonadiene and 4-methyl-1,6-nonadiene, 1,7-dienes such as 1,7-octadiene, 3-methyl-1,7-octadiene, 3-ethyl-1,7-octadiene, 3,4-dimethyl-1,7-octadiene, 3,5-dimethyl-1,7-octadiene, 1,7-nonadiene and 8-methyl-1,7-nonadiene, and 1,11-dodecadiene and 1,13-tetradecadiene.

Examples of the aromatic vinyl compounds include styrene, alkylstyrenes and arylstyrenes such as α-methylstyrene, p-methylstyrene, m-methylstyrene, o-methylstyrene, p-t-butylstyrene and p-phenylstyrene, alkoxystyrenes such as p-methoxystyrene, m-methoxystyrene, p-ethoxystyrene, p-n-propoxystyrene and p-n-butoxystyrene, halogenated styrenes such as p-chlorostyrene, p-bromostyrene and p-iodostyrene, alkyl group-containing silyl styrenes and aryl group-containing silyl styrenes such as p-trimethylsilylstyrene, m-trimethylsilylstyrene, o-trimethylsilylstyrene, p-dimethylphenylsilylstyrene, p-methyldiphenylsilylstyrene and p-triphenylsilylstyrene, halogen-containing silylstyrenes such as p-dimethylchlorosilylstyrene, p-methyldichlorosilylstyrene and p-trichlorosilylstyrene, alkenylstyrenes such as p-(2-propenyl)styrene, m-(2-propenyl)-styrene , p-(3-butenyl)styrene, m-(3-butenyl) styrene, o-(3-butenyl) styrene and p-(3-butenyl)-α-methylstyrene, vinylbiphenyls such as 4-vinylbiphenyl, 3-vinylbiphenyl and 2-vinylbiphenyl, vinylphenylnaphthalenes such as 1-(4-vinylphenyl)naphthalene and 2-(3-vinylphenyl)naphthalene, vinylphenylanthracenes such as 1-(4-vinylphenyl)anthracene and 2-(4-vinylphenyl) anthracene, vinylphenylphenanthrenes such as 1-(4-vinylphenyl)phenanthrene and 2-(4-vinylphenyl) phenanthrene, and vinylphenylpyrenes such as 1-(4-vinylphenyl)pyrene and 2-(4-vinylphenyl)pyrene.

Next, examples of the unsaturated esters include ethyl acrylate and methyl methacrylate, and examples of the lactones include β-propiolactone, β-butyrolactone and γ-butyrolactone. Examples of the lactams include ε-caprolactam and δ-valerolactam, and examples of the epoxides include epoxypropane and 1,2-epoxybutane.

In the present invention, the above-mentioned polymerizable unsaturated compounds which can be copolymerized with the olefin may be used singly or in a combination of two or more thereof, or they may be used together with any of the above-mentioned other α-olefins.

In the process of the present invention, there can be used the polymerization catalyst containing the transition metal compound (A) and the aluminum oxycompound (B) as essential components.

The transition metal compound as the component (A) is represented by the general formula (I):

$$CpML_{x-1} \qquad (I)$$

In the general formula (I), M is a metallic element in the groups 3 to 10 or a lanthanoide series of the periodic table, but the metallic element in the group 4 of the periodic table is preferable, and titanium is particularly preferable. Cp is a cyclic compound group of 5 to 30 carbon atoms having a cyclopentadienyl skeleton or a substituted cyclopentadienyl skeleton which is coordinated with M in a η$^5$-bond state by a π-bond, and L is a σ ligand which is coordinated with M by a σ-bond. Examples of this σ-bond include R', OR', SR', SO$_3$R', NR'R", PR'R", NO$_2$, halogen atoms, a 1-pyrrolyl group and a 1-pyrrolidinyl group. Here, R' and R" are each a hydrocarbon group having 1 to 20 carbon atoms or a silyl group, and in NR'R" and PR'R", R' and R" may be the same or different. When a plurality of the σ ligands are present, the respective ligands may be the same or different, but at least one of the ligands is preferably OR', SR', NR'R" or PR'R". More preferably, two or more of the σ ligands are OR', SR', NR'R" or PR'R", and most preferably, two or more of the σ ligands are OR'. Furthermore, x is a valence number of M. In this connection, it is desirable that Cp and L are not bonded to each other to form a cyclic structure.

The number of the group comprising the cyclic compound of 5 to 30 carbon atoms having the cyclopentadienyl skeleton or the substituted cyclopentadienyl skeleton which is coordinated with M in the η$^5$-bond state by the π-bond is one, and substituents on the substituted cyclopentadienyl skeleton may be bonded to each other to form another cyclic structure. That is to say, groups having an indenyl skeleton, a substituted indenyl skeleton, a fluorenyl skeleton and a substituted fluorenyl skeleton are also included in the cyclic compound groups.

In the above-mentioned R' and R", examples of the hydrocarbon group having 1 to 20 carbon atoms include an alkyl group, a cycloalkyl group, an aryl group and an aralkyl group. Examples of the alkyl group include a methyl group, an ethyl group, an n-propyl group, an isopropyl group, an n-butyl group, an isobutyl group, a sec-butyl group, a t-butyl group, a pentyl group, a hexyl group, an octyl group, a decyl group and a dodecyl group, and examples of the cycloalkyl group include a cyclopentyl group and a cyclohexyl group. Examples of the aryl group include a phenyl group and a tolyl group, and examples of the aralkyl group include a benzyl group and a phenethyl group. Examples of the silyl group include a trimethylsilyl group and a triphenylsilyl group. Typical examples of the OR' include alkoxy groups such as a methoxy group, an ethoxy group, an n-propoxy group, an isopropoxy group, an n-butoxy group, an isobutoxy group, a sec-butoxy group, a t-butoxy group, a pentoxy group, a hexoxy group, an octoxy group and a cyclohexoxy group, and an aryloxy group such as a phenoxy group. Typical examples of SR' include a methylthio group, an ethylthio group, a cyclohexylthio group and a phenylthio group. Typical examples of SO$_3$R' include alkylsulfonyl groups such as a methanesulfonyl group, an ethanesulfonyl group, an n-propanesulfonyl group, an isopropanesulfonyl group, an n-butanesulfonyl group, a sec-butanesulfonyl group, a t-butanesulfonyl group and an isobutanesulfonyl group, and an arylsulfonyl group such as a benzenesulfonyl group. Typical examples of NR'R" include a dimethylamino group, a diethylamino group, a di(n-propyl)amino group, a diisopropylamino group, a di(n-butyl)amino group, a diisobutylamino group, a di(sec-butyl)amino group, a di(t-butyl)amino group, a dipentylamino group, a dihexylamino group, a dioctylamino group, a diphenylamino group, a dibenzylamino group, a methylethylamino group, a (t-butyl)trimethylsilylamino group and a methyltrimethylsilylamino group. Typical examples of PR'R" include a dimethylphosphide group, a diethylphosphide group, a di(n-propyl) phosphide group, a diisopropylphosphide group, a di(n-butyl)phosphide group, a diisobutylsulfide group, a di(sec-butyl)phosphide group, a di(t-butyl)phosphide group, a dipentylphosphide group, a dihexylphosphide group, a dioctylphosphide group, a diphenylphosphide group, a dibenzylphosphide group, a methylethylphosphide group, a (t-butyl)trimethylsilylphosphide group and a methyltrimethylsilylphosphide group. Furthermore, examples of the halogen atoms include chlorine, bromine and iodine.

Examples of the transition metal compound represented by the general formula (I) include cyclopentadienyltitaniumtrimethyl, cyclopentadienyltitaniumtriethyl, cyclopentadienyltitaniumtri(n-propyl),
cyclopentadienyltitaniumtriisopropyl,
cyclopentadienyltitaniumtri(n-butyl),
cyclopentadienyltitaniumtriisobutyl,
cyclopentadienyltitanium-tri(sec-butyl),
cyclopentadienyltitaniumtri(t-butyl),
methylcyclopentadienyltitaniumtrimethyl, 1,2-
dimethylcyclopentadienyltitaniumtrimethyl, 1,2,4-
trimethylcyclopentadienyltitaniumtrimethyl, 1,2,3,4-
tetramethylcyclopentadienyltitaniumtrimethyl,
pentamethylcyclopentadienyltitaniumtrimethyl,
pentamethylcyclopentadienyltitaniumtriethyl,
pentamethylcyclopentadienyltitaniumtri(n-propyl),
pentamethylcyclopentadienyltitaniumtriisopropyl,
pentamethylcyclopentadienyltitaniumtri(n-butyl),
pentamethylcyclopentadienyltitaniumtriisobutyl,
pentamethylcyclopentadienyltitaniumtri(sec-butyl),
pentamethylcyclopentadienyltitaniumtri(t-butyl),
pentamethylcyclopentadienyltitaniumtribenzyl, cyclopentadienyltitanium trimethoxide, cyclopentadienyltitanium triethoxide, cyclopentadienyltitanium tri(n-propoxide), cyclopentadienyltitanium triisopropoxide, cyclopentadienyltitanium triphenoxide, methylcyclopentadienyltitanium trimethoxide, (n-butyl)cyclopentadienyltitanium trimethoxide, dimethylcyclopentadienyltitanium trimethoxide, dimethylcyclopentadienyltitanium triethoxide, dimethylcyclopentadienyltitanium tri(n-propoxide), dimethylcyclopentadienyltitanium triisopropoxide, dimethylcyclopentadienyltitanium triphenoxide, di(t-butyl)cyclopentadienyltitanium trimethoxide, di(t-butyl)cyclopentadienyltitanium triethoxide, di(t-butyl)cyclopentadienyltitanium tri(n-propoxide), di(t-butyl)cyclopentadienyltitanium triisopropoxide, di(t-butyl)cyclopentadienyltitanium triphenoxide, bis(trimethylsilyl)cyclopentadienyltitanium trimethoxide, bis(trimethylsilyl)cyclopentadienyltitanium triethoxide, bis(trimethylsilyl)cyclopentadienyltitanium tri(n-propoxide), bis(trimethylsilyl)cyclopentadienyltitanium triisopropoxide, bis(trimethylsilyl)cyclopentadienyltitanium triphenoxide, trimethylcyclopentadienyltitanium trimethoxide, trimethylcyclopentadienyltitanium triethoxide, trimethylcyclopentadienyltitanium tri(n-propoxide), trimethylcyclopentadienyltitanium triisopropoxide, trimethylcyclopentadienyltitanium triphenoxide, triethylcyclopentadienyltitanium trimethoxide, [bis(trimethylsilyl), methyl] cyclopentadienyltitanium trimethoxide, [di(t-butyl, methyl) ]cyclopentadienyltitanium triethoxide, tetramethylcyclopentadienyltitanium trimethoxide, tetramethylcyclopentadienyltitanium triethoxide, tetramethylcyclopentadienyltitanium tri(n-propoxide), tetramethylcyclopentadienyltitanium triisopropoxide, tetramethylcyclopentadienyltitanium tri(n-butoxide), tetramethylcyclopentadienytitanium triisobutoxide, tetramethylcyclopentadienyltitanium tri(sec-butoxide), tetramethylcyclopentadienyltitanium tri(t-butoxide), tetramethylcyclopentadienyltitanium triphenoxide, [tetramethyl, 4-methoxyphenyl]cyclopentadienyltitanium trimethoxide, [tetramethyl, 4-methoxyphenyl]cyclopentadienyltitanium triethoxide, [tetramethyl, 4-methoxyphenyl] cyclopentadienyltitanium tri(n-propoxide), [tetramethyl, 4-methoxyphenyl]cyclopentadienyltitanium triisopropoxide, [tetramethyl, 4-methoxyphenyl] cyclopentadienyltitanium triphenoxide, [tetramethyl, 4-methylphenyl]cyclopentadienyltitanium trimethoxide, [tetramethyl, 4-methylphenyl] cyclopentadienyltitaniumtriethoxide, [tetramethyl, 4-methylphenyl]cyclopentadienyltitanium tri(n-propoxide), [tetramethyl, 4-methylphenyl]cyclopentadienyltitanium triisopropoxide, [tetramethyl, 4-methylphenyl] cyclopentadienyltitanium triphenoxide, [tetramethyl, benzyl]cyclopentadienyltitanium trimethoxide, [tetramethyl, benzyl]cyclopentadienyltitanium triethoxide, [tetramethyl, benzyl]cyclopentadienyltitanium tri(n-propoxide), [tetramethyl, benzyl]cyclopentadienyltitanium triisopropoxide, [tetramethyl, benzyl] cyclopentadienyltitanium triphenoxide, [tetramethyl, 2-methoxyphenyl]cyclopentadienyltitanium trimethoxide, [tetramethyl, 2-methoxyphenyl]cyclopentadienyltitanium triethoxide, [tetramethyl, 2-methoxyphenyl] cyclopentadienyltitanium triphenoxide, [tetramethyl, ethyl] cyclopentadienyltitanium trimethoxide, [tetramethyl, ethyl] cyclopentadienyltitanium triethoxide, [tetramethyl, ethyl] cyclopentadienyltitanium tri(n-propoxide), [tetramethyl, ethyl]cyclopentadienyltitanium triisopropoxide, [tetramethyl, ethyl]cyclopentadienyltitanium triphenoxide, [tetramethyl, n-butyl]cyclopentadienyltitanium trimethoxide, [tetramethyl, n-butyl] cyclopentadienyltitanium triethoxide, [tetramethyl, n-butyl] cyclopentadienyltitanium tri(n-propoxide), [tetramethyl, n-butyl]cyclopentadienyltitanium triisopropoxide, [tetramethyl, n-butyl]cyclopentadienyltitanium triphenoxide, [tetramethyl, phenyl] cyclopentadienyltitanium trimethoxide, [tetramethyl, phenyl]cyclopentadienyltitanium triethoxide, [tetramethyl, phenyl]cyclopentadienyltitanium triphenoxide, [tetramethyl, trimethylsilyl]cyclopentadienyltitanium trimethoxide, [tetramethyl, trimethylsilyl] cyclopentadienyltitanium triphenoxide, pentamethylcyclopentadienyltitanium trimethoxide, pentamethylcyclopentadienyltitanium triethoxide, pentamethylcyclopentadienyltitanium tri(n-propoxide), pentamethylcyclopentadienyltitanium triisopropoxide, pentamethylcyclopentadienyltitanium tri(n-butoxide), pentamethylcyclopentadienyltitanium triisobutoxide, pentamethylcyclopentadienyltitanium tri(sec-butoxide), pentamethylcyclopentadienyltitanium tri(t-butoxide), pentamethylcyclopentadienyltitanium tri(cyclohexoxide), pentamethylcyclopentadienyltitanium triphenoxide, cyclopentadienyltitanium tribenzyl, indenyltitanium trimethoxide, indenyltitanium triethoxide, indenyltitaniumtrimethyl, indenyltitaniumtribenzyl, cyclopentadienyltitaniumtri (methanesulfonyl), trimethylcyclopentadienyltitanium (tribenzenesulfonyl), tetramethylcyclopentadienyltitaniumtri(ethanesulfonyl), pentamethylcyclopentadienyltitaniumtri(methanesulfonyl), cyclopentadienyltitaniumtris(dimethylamine), trimethylcyclopentadienyltitaniumtris(dimethylamine), pentamethylcyclopentadienyltitaniumtris(dibenzylamine), pentamethylcyclopentadienyltitaniumtris(dimethylamine), pentamethylcyclopentadienyltitaniumtris(diethylamine), cyclopentadienyltitaniumtri(nitro), pentamethylcyclopentadienyltitaniumtri(nitro), and these compounds in which titanium is replaced with zirconium or hafnium.

Additional examples of the transition metal compound represented by the general formula (I) include cyclopentadienyltitaniumdimethyl monochloride, cyclopentadienyltitaniummonoethyl dichloride, cyclopentadienyltitaniumdi(n-propyl) monochloride, cyclopentadienyltitaniumdiisopropyl monochloride, cyclopentadienyltitaniumdi(n-butyl) monochloride, cyclopentadienyltitaniumdiisobutyl monochloride, cyclopentadienyltitaniumdi(sec-butyl) monochloride, cyclopentadienyltitaniumdi(t-butyl)

monochloride, 1,2-dimethylcyclopentadienyltitaniumdimethyl monochloride, 1,2,4-trimethylcyclopentadienyltitaniumdimethyl monochloride, 1,2,3,4-tetramethylcyclopentadienyltitaniumdimethyl monochloride, pentamethylcyclopentadienyltitaniumdimethyl monochloride, cyclopentadienyltitaniummonochloro dimethoxide, cyclopentadienyltitaniumdichloro monomethoxide, cyclopentadienyltitaniumdichloro monoethoxide, cyclopentadienyltitaniummonochloro di(n-propoxide), cyclopentadienyltitaniummonochloro diisopropoxide, cyclopentadienyltitaniummonochloro diphenoxide, dimethylcyclopentadienyltitaniummonochloro dimethoxide, dimethylcyclopentadienyltitaniummonochloro diethoxide, dimethylcyclopentadienyltitaniummonochloro di(n-propoxide), dimethylcyclopentadienyltitaniummonochloro diisopropoxide, dimethylcyclopentadienyltitaniummonochloro diphenoxide, di(t-butyl)cyclopentadienyltitaniummonochloro dimethoxide, bis(trimethylsilyl)cyclopentadienyltitaniummonochloro dimethoxide, trimethylcyclopentadienyltitaniummonochloro dimethoxide, trimethylcyclopentadienyltitaniummonochloro diphenoxide, triethylcyclopentadienyltitaniummonochloro dimethoxide, [bis(trimethylsilyl), methyl]cyclopentadienyltitaniummonochloro dimethoxide, t etramethylcyclopentadienyltitaniummonochloro dimethoxide, tetramethylcyclopentadienyltitaniumdichloro monomethoxide, tetramethylcyclopentadienyltitaniummonochloro di(n-butoxide), tetramethylcyclopentadienyltitaniummonochloro diisobutoxide, tetramethylcyclopentadienyltitaniummonochloro di(sec-butoxide), tetramethylcyclopentadienyltitaniummonochloro di(t-butoxide), [tetramethyl, 4-methoxyphenyl]cyclopentadienyltitaniummonochloro dimethoxide, [tetramethyl, 4-methylphenyl]cyclopentadienyltitaniummonochloro dimethoxide, [tetramethyl, benzyl]cyclopentadienyltitaniummonochloro dimethoxide, [tetramethyl, benzyl]cyclopentadienyltitaniummonochloro diphenoxide, [tetramethyl, 2-methoxyphenyl]cyclopentadienyltitaniummonochloro dimethoxide, [tetramethyl, ethyl]cyclopentadienyltitaniummonochloro dimethoxide, [tetramethyl, ethyl]cyclopentadienyltitaniummonochloro diethoxide, [tetramethyl, n-butyl]cyclopentadienyltitaniummonochloro diethoxide, [tetramethyl, n-butyl]cyclopentadienyltitaniummonochloro di(n-propoxide), [tetramethyl, n-butyl]cyclopentadienyltitaniummonochloro diisopropoxide, [tetramethyl, phenyl]cyclopentadienyltitaniummonochloro dimethoxide, [tetramethyl, trimethylsilyl]cyclopentadienyltitaniummonochloro dimethoxide, pentamethylcyclopentadienyltitaniummonochloro dimethoxide, pentamethylcyclopentadienyltitaniumdichloro monomethoxide, pentamethylcyclopentadienyltitaniummonochloro diethoxide, pentamethylcyclopentadienyltitaniummonochloro di(cyclohexoxide), pentamethylcyclopentadienyltitaniummonochloro diphenoxide, indenyltitaniummonochloro dimethoxide, cyclopentadienyltitaniummonochlorodi(methanesulfonyl), pentamethylcyclopentadienyltitaniummonochlorobis(diethylamine), pentamethylcyclopentadienyltitaniummonochlorobis[di(n-butyl)amine], pentamethylcyclopentadienyltitaniumdichloro(dimethylamine), pentamethylcyclopentadienyltitaniumdimethoxy(dimethylamine), pentamethylcyclopentadienyltitaniumdichloro(diphenylamine), pentamethylcyclopentadienyltitaniumdichloro(methylethylamine), pentamethylcyclopentadienyltitaniumdichloro(t-butyltrimethylsilylamine), pentamethylcyclopentadienyltitaniumdimethoxy(diphenylamine), pentamethylcyclopentadienyltitaniummonochlorobis(diethyl phosphide), pentamethylcyclopentadienyltitaniummonochlorobis[di(n-butyl) phosphide], pentamethylcyclopentadienyltitaniumdichloro(dimethyl phosphide), pentamethylcyclopentadienyltitaniumdimethoxy(dimethyl phosphide), pentamethylcyclopentadienyltitaniumdichloro(diphenyl phosphide), pentamethylcyclopentadienyltitaniumdichloro(methylethyl phosphide), pentamethylcyclopentadienyltitaniumdichloro(t-butyltrimethylsilyl phosphide), pentamethylcyclopentadienyltitaniumdimethoxy(diphenyl phosphide), and these compounds in which titanium is replaced with zirconium, hafnium, chromium or a metallic element in the groups 3 to 10 and a lanthanoide series of the periodic table.

In the polymerization catalyst of the present invention, the transition metal compounds as the component (A) may be used singly or in a combination of two or more thereof.

In the polymerization catalyst of the present invention, examples of the aluminum oxycompound which can be used as the component (B) include a chain aluminoxane represented by the general formula (II)

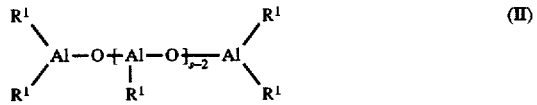

(wherein $R^1$s are each a hydrocarbon group such as an alkyl group, an alkenyl group, an aryl group or an arylalkyl group having 1 to 20 carbon atoms, preferably 1 to 12 carbon atoms, and they may be the same or different (e.g., products obtained by hydrolyzing a plurality of alkylaluminums); and s is a polymerization degree, and it is an integer of usually 2 to 50, preferably 3 to 40), and a cyclic aluminoxane represented by the general formula (III)

(wherein $R^1$ is the same as defined above; and p is a polymerization degree, and it is an integer of usually 3 to 50, preferably 7 to 40).

As a preparation method of the above-mentioned aluminoxanes, a method can be mentioned in which an alkylaluminum is brought into contact with a condensation agent such as water, but no particular restriction is put on its means, and the reaction can be carried out in a known manner. For example, there are (1) a method which comprises dissolving an organic aluminum compound in an organic solvent, and then bringing the solution into contact with water, (2) a method which comprises first adding an organic aluminum compound at the time of polymerization, and then adding water, (3) a method which comprises reacting water of crystallization contained in a metallic salt or water adsorbed by an inorganic substance or an organic substance with an organic aluminum compound, and (4) a method which comprises reacting a tetraalkyldialuminoxane with a trialkylaluminum, and further reacting with water. In this connection, the aluminoxane may be insoluble in toluene.

These aluminoxanes can be classified as follows.

(a) The aluminoxanes prepared by the use of single alkylaluminum (organic aluminum) compounds, and for example, methylaluminoxane, ethylaluminoxane, n-propylaluminoxane, isopropylaluminoxane, n-butylaluminoxane, isobutylaluminoxane, sec-butylaluminoxane and t-butylaluminoxane.

(b) A mixed alkylaluminoxane obtained by selecting two or more from the alkylaluminoxanes prepared in the above-mentioned (a), and then mixing them in a predetermined ratio.

(c) Copolymerized alkylaluminoxanes obtained by mixing two or more of alkylaluminum (organic aluminum) compounds in a predetermined ratio in a preparation step of any of the above-mentioned methods (1) to (4), and for example, methyl-ethylaluminoxane, methyl-n-propylaluminoxane, methyl-isopropylaluminoxane, methyl-n-butylaluminoxane, methyl-isobutylaluminoxane, ethyl-n-propylaluminoxane, ethyl-isopropylaluminoxane, ethyl-n-butylaluminoxane and ethyl-isobutylaluminoxane.

These aluminoxanes may be used singly or in a combination of two or more thereof. Among these aluminoxanes, the alkylaluminoxanes are particularly preferable.

A use ratio of the catalytic component (A) to the catalytic component (B) in the polymerization catalyst which can be used in the present invention is required to be selected so that a molar ratio (in terms of a metallic atom) of the component (B)/the component (A) may be within the range of 2 to 500. However, when the metallic atom of the component (A) is titanium, the molar ratio is preferably in the range of 5 to 250, more preferably 5 to 200, most preferably 10 to 200. Alternatively, when it is a metallic atom other than titanium, the molar ratio is preferably in the range of 5 to 500, more preferably 10 to 500, most preferably 20 to 500.

In the present invention, the component (A) is used in an amount of usually 0.0001 to 10 mmol, preferably 0.0005 to 2 mmol in terms of the transition metal atom per liter of the total polymerization system. On the other hand, the component (B) is used in an amount of usually 0.001 to 20 mmol, preferably 0.005 to 10 mmol, more preferably 0.01 to 5 mmol in terms of the aluminum atom per liter of the total polymerization system. The polymerization catalyst contains the components (A) and (B) as the essential components, but if desired, it may further contain an organic aluminum compound as a component (C).

Here, as the organic aluminum compound of the component (C), there can be used a compound which can be represented by the general formula (IV)

$$R^2{}_r AlQ_{3-r} \qquad (IV)$$

wherein $R^2$ is an alkyl group having 1 to 10 carbon atoms; Q is a hydrogen atom, an alkoxy group having 1 to 20 carbon atoms, an aryl group having 6 to 20 carbon atoms or a halogen atom; and r is an integer of 1 to 3.

Typical examples of the compound represented by the general formula (IV) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

These organic aluminum compounds may be used singly or in a combination of two or more thereof.

A molar ratio of the catalytic component (A) to the catalytic component (C) is preferably 1:0.01 to 1:30, more preferably 1:0.02 to 1:25, most preferably 1:0.02 to 1:10. The employment of the catalytic component (C) can improve the polymerization activity of the catalyst per unit amount of the transition metal, but if the amount of the catalytic component (C) is excessive, the organic aluminum compound is wasteful and what is worse, it unpreferably remains in large quantities in the polymer.

In the process of the present invention, at least one of the catalytic components can be supported onto, for example, a solid inorganic carrier or organic carrier which is insoluble in a hydrocarbon solvent, and then used. Typical examples of the inorganic carriers include $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica-alumina, zeolite, ferrite, sepiolite and glass fiber. In addition, magnesium compounds such as $MgCl_2$ and $Mg(OC_2H_5)_2$ are also usable.

On the other hand, examples of the organic carrier include polymers such as polystyrenes, styrene-divinylbenzene copolymers, polyethylenes, polypropylenes, substituted polystyrenes and polyarylates, starch and carbon. In the case of a gaseous phase polymerization method or the like, the usable carriers are not limited to carriers which are insoluble in the hydrocarbon solvent. Among these carriers, $MgCl_2$, $Mg(OC_2H_5)_2$, $SiO_2$ and $Al_2O_3$ are particularly preferable. The average particle diameter of the carrier is usually in the range of 1 to 300 μm, preferably 10 to 200 μm, more preferably 20 to 100 μm.

with regard to polymerization conditions, polymerization temperature is preferably higher in the range in which a catalytic activity is not impaired, and it is usually in the range of −100° to 300° C., preferably −50 to 250° C., more preferably 20° to 230° C. Polymerization pressure is usually in the range of atmospheric pressure to 150 kg/cm²G, preferably atmospheric pressure to 100 kg/cm²G.

No particular restriction is put on a polymerization method, and any method of a slurry polymerization method, a gaseous phase polymerization method, a bulk polymerization method, a solution polymerization method and a suspension polymerization method may be used.

In the case that a polymerization solvent is used, examples of the usable polymerization solvent include aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane, and halogenated hydrocarbons such as chloroform and dichloromethane. These solvents may be used singly or in a combination of two or more thereof. Furthermore, a monomer such as the α-olefin may be used as the solvent. Incidentally, the polymerization can be carried out under non-solvent conditions, depending upon the polymerization method.

The molecular weight of the polymer can be adjusted by suitably selecting the amount of a chain transfer agent such as hydrogen, the kind and the amount of catalytic components, the polymerization temperature and the ethylene pressure.

In the process of the present invention using the above-mentioned polymerization catalyst, when two or more kinds of olefins are copolymerized or when an olefin is copolymerized with another polymerizable unsaturated compound, the conversion of the comonomer component at the time of the copolymerization can attain usually 5% or more, preferably 8% or more, more preferably 10% or more, and therefore one feature of the present invention is that the polymerization catalyst is extremely excellent in copolymerizability. In this connection, the copolymerizability can be evaluated by copolymerizing ethylene with a predetermined comonomer in a batch polymerization under the constant conditions of temperature, pressure, time and the like.

In the olefin polymer obtained by the process of the present invention, any components which are insoluble in xylene at a temperature of 135° C. are not present, and the intrinsic viscosity of the obtained polymer measured in decalin at a temperature of 135° C. is usually in the range of 0.1 to 20 dl/g. If this intrinsic viscosity is less than 0.1 dl/g, mechanical strength is not sufficient, and if it is more than 20 dl/g, molding and working properties deteriorate.

The present invention also intends to provide an ethylenic polymer having specific characteristics.

The ethylenic polymer of the present invention is a homopolymer of ethylene, or a copolymer of ethylene and at least one selected from the group consisting of other olefins and polymerizable unsaturated compounds. Examples of the other olefins and the polymerizable unsaturated compounds which can be used in the copolymer include α-olefins other than ethylene, particularly α-olefins having 3 to 20 carbon atoms, aromatic vinyl compounds, cyclic olefins and diolefins (cyclic diolefins, chain conjugated diolefins and, chain non-conjugated diolefins).

These comonomers may be used singly or in a combination of two or more thereof.

In the ethylenic copolymer, the content of the comonomer unit is preferably in the range of 0.01 to 45 mol %. On the other hand, when the diolefin unit is contained, the content of this diolefin unit is usually 1 mol % or less, preferably 0.8 mol % or less, more preferably 0.6 mol % or less, most preferably 0.4 mol % or less. If the content of this diolefin unit is more than 1 mol %, the problem of gelation due to crosslinking takes place.

The ethylenic polymer of the present invention is required to have the following characteristics.

In the first place, (a) a ratio Mw/Mn of a weight-average molecular weight (Mw) to a number-average molecular weight (Mn) of the ethylenic copolymer in terms of a polyethylene measured by a gel permeation chromatography (GPC) method is required to be within the range of 1.5 to 4. If this ratio Mw/Mn is less than 1.5, the molecular weight distribution of the ethylenic copolymer is too narrow, so that the molding and working properties deteriorate. If it is more than 4, the mechanical properties of the copolymer are insufficient. The ratio Mw/Mn is preferably in the range of 1.6 to 3.5, more preferably 1.6 to 3.3.

Furthermore, the weight-average molecular weight (Mw) of the ethylenic copolymer is required to be in the range of 3,000 to 1,000,000. If this Mw is less than 3,000, the mechanical properties are insufficient, and if it is more than 1,000,000, the molding and working properties deteriorate. From the viewpoints of the mechanical properties and the molding and working properties, the preferable range of the Mw is in the range of 5,000 to 800,000, more preferably 7,000 to 700,000.

The above-mentioned Mw and Mn are values in terms of the polyethylene measured by the GPC method under conditions of device=Waters ALC/GPC 150C, column=TSK HM+GMH6×2, flow rate=1.0 ml/min and solvent=1,2,4-trichlorobenzene.

Moreover, (b) a relation between a half value width [W (°C.)] of the main peak of a composition distribution curve obtained by a temperature rising elution fractionation and a temperature position [T (°C.)] of the main peak is required to meet the equation $$W \geq -24.9 + 2470/T.$$

If W is less than $(-24.9+2470/T)$, the melt properties and the mechanical properties of the ethylenic copolymer deteriorate. The relation between W and T is preferably $$W \geq -23.9 + 2470/T$$

more preferably $$W \geq -22.9 + 2470/T$$

most preferably $$W \geq -21.0 + 2470/T$$

wherein T is a value which meets the relation of $$30 \geq T \geq_b 99.$$

The above-mentioned W and T are values obtained by the following temperature rising elution fractionation. That is to say, a polymer solution of o-dichlorobenzene whose concentration is adjusted to about 6 g/liter at 135° C. is injected, by a constant delivery pump, into a column having an inner diameter of 10 mm and a length of 250 mm which is filled with Chromosorb PNAN (80/100 mesh) as a column filler. The polymer solution is cooled to room temperature at a rate of 10° C./hr, whereby the polymer is adsorbed and crystallized on the filler. Afterward, o-dichlorobenzene is fed at a feed rate of 2 cc/min under temperature rising conditions of 20° C./hr. Then, the concentration of the eluted polymer is measured by an infrared detector (device: 1-A Fox Boro CVF Co., Ltd., cell: $CaF_2$), and the composition distribution curve to an elution temperature is depicted to obtain W and T.

Next, (c) an activation energy (Ea) of melt flow in the ethylenic polymer is required to be within the range of 7.5 to 20 kcal/mol. If this Ea is less than 7.5 kcal/mol, sufficient melt flow properties cannot be obtained. This Ea is preferably in the range of 8 to 19 kcal/mol, more preferably 8.5 to 18 kcal/mol. Here, the activation energy (Ea) of the melt flow is a value obtained in the following manner. First, frequency dependencies ($10^{-2}$ to $10^2$ rad/sec) of dynamic viscoelastic properties are measured at temperatures of 15° C., 170° C., 190° C., 210° C. and 230° C., and the activation energy (Ea) is then calculated on the basis of the shift factors of G' and G" at the respective temperatures and the reciprocal number of an absolute temperature in accordance with the Arrhenius' equation by the use of a temperature-time conversion rule at a standard temperature of 170° C.

In addition, (d) a resin density of the ethylenic polymer is required to be in the range of 0.85 to 0.97 g/cm³. This resin density (d) can optionally be controlled in the above-mentioned range by adjusting the content of the comonomer unit. Incidentally, this density is a value obtained by measuring, with a density gradient tube, the pressed sheet which is formed at a temperature of 190° C. and then quenched.

Among the ethylenic polymers of the present invention having such characteristics, a copolymer is preferable which is obtained from ethylene and at least one selected from the group consisting of α-olefins and diolefins having 3 to 20 carbon atoms and in which a relation between the weight-average molecular weight (Mw) and a die swell ratio ($D_R$) meets the equation $D_R > 0.5 + 0.125 \times \log Mw$, preferably $1.80 > D_R > 0.36 + 0.159 \times \log Mw$, more preferably $1.75 > D_R > 0.16 + 0.210 \times \log Mw$, most preferably $1.70 > D_R > 0.11 + 0.279 \times \log Mw$.

If the $D_R$ is not more than $(0.5 + 0.125 \times \log Mw)$, the sufficient swell cannot be obtained, and a problem such as a neck-in takes place at the time of extrusion.

Here, the die swell ratio ($D_R$) is a value ($D_1/D_0$) obtained by measuring a diameter ($D_1$, mm) of a strand formed by extrusion through a capillary nozzle [diameter ($D_0$)=1.275 mm, length (L)=51.03 mm, L/$D_0$=40, and entrance angle= 90°] at an extrusion speed of 1.5 mm/min (shear rate=10 sec$^{-1}$) at a temperature of 190° C. by the use of a capillograph made by Toyo Seiki Seisakusho Co., Ltd., and then dividing this diameter by the diameter of the capillary nozzle.

The above-mentioned diameter ($D_1$) of the strand is an average value of values obtained by measuring long axes and short axes of central portions of 5 samples having a extruded strand length of 5 cm (a length of 5 cm from a nozzle outlet).

The ethylene polymer of the present invention can be mixed with another thermoplastic resin and then used. Examples of the other thermoplastic resin include polyolefin resins, polystyrene resins, condensation series high-molecular weight polymers and addition polymerization series high-molecular weight polymers. Typical examples of the polyolefin resins include high-density polyethylenes, low-density polyethylenes, poly-3-methylbutene-1, poly-4-methylpentene-1, straight-chain low-density polyethylenes obtained by the use of 1-butene, 1-hexene, 1-octene, 4-methylpentene-1 and 3-methylbutene-1 as comonomer components, ethylene-vinyl acetate copolymers, saponified ethylene-vinyl acetate copolymers, ethylene-acrylic acid copolymers, ethylene-acrylic acid ester copolymers, ethylenic ionomers and polypropylene. Typical examples of the polystyrene resins include general-purpose polystyrenes, isotactic polystyrenes and (rubber modified) high-impact polystyrenes. Typical examples of the condensation series high-molecular weight polymers include polyacetal resins, polycarbonate resins, polyamide resins such as 6-nylon and 6,6-nylon, polyester resins such as polyethylene terephthalate and polybutylene terephthalate, polyphenylene ether resins, polyimide resins, polysulfone resins, polyether sulfonic resins and polyphenylene sulfide resins. Examples of the addition polymerization series high-molecular weight polymers include polymers obtained from polar vinyl monomers and polymers obtained from diene monomers, typically, polymethyl methacrylate, polyacrylonitrile, acrylonitrile-butadiene copolymer, acrylonitrile-butadiene-styrene copolymer, diene polymers in which a diene chain is hydrogenated, and thermoplastic elastomers.

In the case that the ethylenic polymer of the present invention is mixed with the other thermoplastic resin, the amount of the other thermoplastic resin is in the range of 2 to 500 parts by weight, preferably 3 to 300 parts by weight based on 100 parts by weight of the ethylenic polymer of the present invention.

No particular restriction is put on a manufacturing method of the ethylenic polymer of the present invention, but the above-mentioned preparation process of the olefin polymer of the present invention can be used to advantageously manufacture the ethylenic polymer.

Next, the present invention will be described in more detail with reference to examples and comparative examples, but the scope of the present invention should not be limited to these examples at all.

Preparation Example 1

[Preparation of methylaluminoxane (MAO)]

In a 500-ml glass container purged with nitrogen were placed 200 ml of toluene, 17.7 g (71 mmol) of copper sulfate pentahydrate ($CuSO_4 \cdot 5H_2O$) and 24 ml (250 mmol) of trimethylaluminum, and the mixture was then reacted at 40° C. for 8 hours.

Afterward, a solid component was removed from the reaction mixture, and toluene was then distilled under reduced pressure from the solution to obtain 6.7 g of a catalyst product (methylaluminoxane: MAO). Its molecular weight was 610, as measured by a cryoscopic method. Furthermore, a high-magnetic component according to $^1$H-NMR measurement described in Japanese Patent Application Laid-open No. 325391/1987, i.e., a methyl proton signal based on an "Al—CH$_3$" bond according to the observation of a proton nuclear magnetic resonance spectrum in a toluene solution at room temperature was observed in the range of 1.0 to −0.5 ppm on the basis of tetramethylsilane. Since the proton signal (0 ppm) of tetramethylsilane was within the observation region of the methyl proton based on the "Al—CH$_3$" bond, the methyl proton signal based on this "Al—CH$_3$" bond was measured on the basis of the methyl proton signal (2.35 ppm) of toluene based on tetramethylsilane, and this signal was then divided into the high-magnetic component (i.e., −0.1 to −0.5 ppm) and another magnetic component (i.e., 1.0 to −0.1 ppm). At this time, the ratio of the high-magnetic component was 43% of the total.

Preparation Example 2

[Preparation of isobutylaluminoxane (BAO)]

The same procedure as in Preparation Example 1 was repeated except that 250 mmol of trimethylaluminum was replaced with 250 mmol of triisobutylaluminum and 71 mmol of copper sulfate pentahydrate was replaced with 30 mmol of aluminum sulfate dodecahydrate. From a solution obtained by the removal of a solid component, toluene was further distilled off under reduced pressure to obtain 7.6 g of a catalyst product (isobutylaluminoxane: BAO). Its molecular weight was 1,220, as measured by a cryoscopic method. In polymerization, BAO was used in the state of a toluene solution (2 mol/liter).

Preparation Example 3

[Preparation of methyl-isobutylaluminoxane (MBAO)]

The same procedure as in Preparation Example 2 was repeated except that triisobutylaluminum was replaced with 240 mmol of an aluminum compound obtained by mixing trimethylaluminum and triisobutylaluminum in a molar ratio of 2:1 and this aluminum compound was reacted with aluminum sulfate dodecahydrate in the same manner as in Preparation Example 2, thereby obtaining 6.3 g of a catalyst product (methyl-isobutylaluminoxane: MBAO). Its molecular weight was 2,380.

Preparation Example 4

[Preparation of ethyl-isobutylaluminoxane (EBAO)]

The same procedure as in Preparation Example 3 was repeated except that trimethylaluminum was replaced with triethylaluminum, thereby obtaining 6.5 g of a catalyst product (ethyl-isobutylaluminoxane: EBAO). Its molecular weight was 2,100.

Preparation Example 5

[Preparation of aluminum oxycompound having low polymerization degree]

In a 500-ml glass container purged with nitrogen were placed 250 ml of toluene and 24 ml of triisobutyl-aluminum (95 mmol), and the mixture was then slowly cooled to −78° C. In this condition, pure water was slowly added dropwise in an amount of 0.5 equivalent to the aluminum compound, and the mixture was then slowly heated to form a catalytic reaction product of water and the aluminum compound. In this case, any solid component was not produced. Next, toluene was distilled off under reduced pressure to obtain 4.7 g of an aluminum oxycompound having a low polymerization degree (LBAO). Its molecular weight was about 320, as measured by a cryoscopic method. This LBAO was used in the state of a 1.0 mol/liter toluene solution. Incidentally, for the preparation of this LBAO, Japanese Patent Application Laid-open No. 25319/1994 was referred to.

Preparation Example 6

[Preparation of mixed aluminoxane (MAO-BAO)]

MAO and BAO prepared in Preparation Examples 1 and 2 were mixed with each other in a molar ratio of 2:1, and its toluene solution was then prepared so as to be 2 mol/liter in terms of an aluminum concentration.

EXAMPLE 1

In a 1,000-ml reactor equipped with a stirrer were placed 400 ml of toluene and 1.0 mmol of methylaluminoxane (MAO) obtained in Preparation Example 1, and the mixture was heated up to 80° C. and stirring was then started. Next, a toluene solution containing 0.01 mmol of pentamethylcyclopentadienyltitanium trimethoxide was added to the mixture, and ethylene was then polymerized for 1 hour under a partial pressure of 8.0 kg/cm$^2$G.

After the completion of the reaction, an unreacted gas was removed, and the resulting polymer was washed with an acidic methanol to remove the catalytic component. Afterward, the polymer was sufficiently washed with methanol, and then dried in vacuo to obtain 42.8 g of an ethylene polymer. Its polymerization activity was 1,580 g.polymer/g.Al.

This ethylene polymer had a melting point (Tm) of 133.5° C. as measured by a differential scanning calorimeter (DSC), a crystallization enthalpy ($\Delta$H) of 139.8 J/g, and an intrinsic viscosity [η] of 3.02 dl/g as measured in decalin at 135° C.

Examples 2 to 7, and Comparative Examples 1 and 2

Each polymerization was carried out under conditions shown in Table 1 by the same procedure as in Example 1. Table 2 shows the yields of obtained polymers, polymerization activities, comonomer unit contents, comonomer conversions and the physical properties of the polymers.

TABLE 1

| | Polymerization Conditions | | | |
|---|---|---|---|---|
| | Main Catalyst | | Promotor | |
| | Kind | Amount (mmol) | Kind | Amount (mmol) |
| Example 1 | Catalyst I | 0.01 | MAO | 1.0 |
| Example 2 | Catalyst I | 0.01 | MAO | 0.5 |
| Comp. Ex. 1 | Catalyst I | 0.01 | MAO | 10.0 |
| Example 3 | Catalyst I | 0.01 | MAO | 1.0 |
| Example 4 | Catalyst I | 0.01 | MAO | 1.0 |
| Comp. Ex. 2 | Catalyst I | 0.01 | MAO | 10.0 |
| Example 5 | Catalyst I | 0.01 | MAO | 1.0 |
| Example 6 | Catalyst II | 0.01 | MAO | 1.0 |
| | | | TIBA | 0.1 |
| Example 7 | Catalyst II | 0.01 | MAO | 4.0 |

| | Polymerization Conditions | | |
|---|---|---|---|
| | MAO/Main Catalyst | Comonomer | |
| | (molar ratio in terms of metal) | Kind | Amount (mmol) |
| Example 1 | 100 | — | — |
| Example 2 | 50 | — | — |
| Comp. Ex. 1 | 1,000 | — | — |
| Example 3 | 100 | 1,5-hexadiene | 170 |
| Example 4 | 100 | 1-octene | 512 |
| Comp. Ex. 2 | 1,000 | 1-octene | 256 |
| Example 5 | 100 | 1-octene | 192 |
| Example 6 | 100 | — | — |
| Example 7 | 400 | 1-octene | 256 |

Catalyst I: Pentamethylcyclopentadienyltitanium trimethoxide
Catalyst II: Pentamethylcyclopentadienylzirconium trimethoxide
MAO: Methylaluminoxane (Preparation Example 1)
TIBA: Triisobutylaluminum
Polymerization conditions: Total system amount (a toluene amount or the total amount of toluene and the comonomer) = 400 ml, temperature = 80° C., ethylene pressure = 8.0 kg/cm$^2$ · G, polymerization time = 1 hour

TABLE 2

| | Yield of Polymer (g) | Polymerization Activity (g · polymer /g · Al) | Comonomer | |
|---|---|---|---|---|
| | | | Unit Content | Conversion (%) |
| Example 1 | 42.8 | 1,580 | — | — |
| Example 2 | 39.6 | 2,940 | — | — |
| Comp. Ex. 1 | 3.9 | 14.4 | — | — |
| Example 3 | 40.2 | 1,488 | 1.9 | 15 |
| Example 4 | 80.4 | 2,978 | 12.2 | 50 |
| Comp. Ex. 2 | 6.9 | 21.7 | 3.2 | 2.8 |
| Example 5 | 59.1 | 2,188 | 7.8 | 69 |
| Example 6 | 50.8 | 1,710 | — | — |
| Example 7 | 57.4 | 532 | — | — |

| | Intrinsic Viscosity (dl/g) | DSC | |
|---|---|---|---|
| | | Tm (°C.) | $\Delta$H (J/g) |
| Example 1 | 3.02 | 133.5 | 139.8 |
| Example 2 | 3.51 | 133.5 | 128.5 |
| Comp. Ex. 1 | 2.07 | 132.3 | 174.1 |
| Example 3 | 3.12 | 127.1 | 187.6 |
| Example 4 | 1.72 | — | — |
| Comp. Ex. 2 | 1.60 | 117.2 | 110.7 |
| Example 5 | 2.85 | 79.9 | 26.0 |

TABLE 2-continued

| | | | |
|---|---|---|---|
| Example 6 | 3.62 | 135.0 | 171.7 |
| Example 7 | 2.50 | 124.7 | 128.2 |

Comonomer unit content: (mol %)
Example 3: Toluene at 135° C., and any decalineinsoluble component was not present.
Example 4: The copolymer was amorphous.

Examples 8 to 19 and Comparative Example 3

Each polymerization was carried out under polymerization conditions shown in Table 3 by the same procedure as in Example 1. Table 4 shows the yields of obtained polymers, polymerization activities, comonomer unit contents, comonomer conversions and the physical properties of the polymers.

TABLE 3

| | Polymerization Conditions | | | |
|---|---|---|---|---|
| | Main Catalyst | | Promotor | |
| | Kind | Amount (mmol) | Kind | Amount (mmol) |
| Example 8 | Catalyst I | 0.01 | MAO | 1.0 |
| Example 9 | Catalyst I | 0.01 | LBAO | 0.5 |
| Example 10 | Catalyst I | 0.01 | MAO-BAO | 1.0 |
| Example 11 | Catalyst III | 0.01 | MAO | 1.0 |
| Example 12 | Catalyst III | 0.01 | MAO | 1.0 |
| Comp. Ex. 3 | Catalyst III | 0.01 | MAO | 10.0 |
| Example 13 | Catalyst III | 0.01 | BAO | 1.0 |
| Example 14 | Catalyst IV | 0.01 | MAO | 1.0 |
| Example 15 | Catalyst IV | 0.01 | MAO | 1.0 |
| Example 16 | Catalyst V | 0.01 | MAO | 1.0 |
| Example 17 | Catalyst V | 0.01 | MAO | 1.0 |
| Example 18 | Catalyst I | 0.01 | EBAO | 1.0 |
| Example 19 | Catalyst I | 0.01 | MBAO | 1.0 |

| | Polymerization Conditions | | |
|---|---|---|---|
| | MAO/Main Catalyst | Comonomer | |
| | (molar ratio in terms of metal) | Kind | Amount (mmol) |
| Example 8 | 100 | 5-vinylnorbornene | 25 |
| Example 9 | 50 | 1-octene | 128 |
| Example 10 | 100 | 1-octene | 128 |
| Example 11 | 100 | — | — |
| Example 12 | 100 | 1-octene | 128 |
| Comp. Ex. 3 | 1,000 | 1-octene | 128 |
| Example 13 | 100 | 1-octene | 128 |
| Example 14 | 100 | — | — |
| Example 15 | 100 | 1-octene | 256 |
| Example 16 | 100 | — | — |
| Example 17 | 100 | 1-octene | 128 |
| Example 18 | 100 | 1-octene | 128 |
| Example 19 | 100 | 3,5,5-trimethyl-hexene-1 | 128 |

(Notes)
Catalyst I: Pentamethylcyclopentadienyltitanium trimethoxide
Catalyst II: Pentamethylcyclopentadienylzirconium trimethoxide
Catalyst III: Pentamethylcyclopentadienyltitanium tris(diethylamine)
Catalyst IV: [n-butyl, tetramethyl]cyclopentadienyltitanium trimethoxide
Catalyst V: Pentamethylcyclopentadienyltitanium monochlorodimethoxide
MAO: Methylaluminoxane (Preparation Example 1)
BAO: Isobutylaluminoxane (Preparation Example 2)
MBAO: Methyl.isobutylaluminoxane (Preparation Example 3)
EBAO: Ethyl.isobutylaluminoxane (Preparation Example 4)
LBAO: Aluminum oxycompound having a low polymerization degree (Preparation Example 5)
MAO-BAO: Mixed aluminoxane (Preparation Example 6)

TABLE 3-continued

Polymerization conditions: Total system amount (a toluene amount or the total amount of toluene and the comonomer) = 400 ml, temperature = 80° C., ethylene pressure = 8.0 kg/cm² · G, polymerization time = 1 hour

TABLE 4

| | Yield of Polymer (g) | Polymerization Activity (g · polymer /g · Al) | Comonomer Unit Content | Comonomer Conversion (%) |
|---|---|---|---|---|
| Example 8 | 35.8 | 1,326 | 1.6 | 78 |
| Example 9 | 22.6 | 837 | 6.3 | 33 |
| Example 10 | 52.5 | 1,945 | 7.4 | 89 |
| Example 11 | 20.7 | 767 | — | — |
| Example 12 | 60.6 | 2,245 | 4.8 | 71 |
| Comp. Ex. 3 | 12.5 | 463 | 1.2 | 4.0 |
| Example 13 | 19.4 | 719 | 5.2 | 24 |
| Example 14 | 107.3 | 3,976 | — | — |
| Example 15 | 92.7 | 3,435 | 7.2 | 77 |
| Example 16 | 38.4 | 1,428 | — | — |
| Example 17 | 57.7 | 2,145 | 6.3 | 85 |
| Example 18 | 30.2 | 1,119 | 7.0 | 49 |
| Example 19 | 44.2 | 1,638 | 7.5 | 73 |

| | Intrinsic Viscosity (dl/g) | DSC Tm (°C.) | DSC ΔH (J/g) |
|---|---|---|---|
| Example 8 | 2.42 | 124.3 | 156.1 |
| Example 9 | 2.69 | 80.6 | 48.5 |
| Example 10 | 1.98 | 84.8 | 50.8 |
| Example 11 | 9.10 | 128.9 | 258.9 |
| Example 12 | 2.94 | 110.7 | 60.5 |
| Comp. Ex. 3 | 1.62 | 120.9 | 153.8 |
| Example 13 | 3.62 | 106.2 | 84.2 |
| Example 14 | 5.27 | 133.9 | 163.6 |
| Example 15 | 2.69 | 83.3 | 44.6 |
| Example 16 | 6.48 | 133.1 | 233.2 |
| Example 17 | 2.83 | 87.1 | 46.2 |
| Example 18 | 2.99 | 78.5 | 40.8 |
| Example 19 | 2.42 | 95.7 | 105.3 |

Comonomer unit content: (mol %)

EXAMPLE 20

In a 1,000-ml reactor equipped with a stirrer were placed 400 ml of toluene, 20 ml of 1-octene and 1.0 mmol of methylaluminoxane (MAO) obtained in Preparation Example 1, and the mixture was heated up to 85° C. and stirring was then started. Next, a toluene solution containing 0.01 mmol of pentamethylcyclopentadienyltitanium tri (cyclohexoxide) was added to the mixture, and ethylene was then polymerized for 30 minutes under 8.0 kg/cm²G.

After the completion of the reaction, an unreacted gas was removed, and the resulting polymer was washed with an acidic methanol to remove the catalytic component. Afterward, the polymer was sufficiently washed with methanol, and then dried in vacuo to obtain 26.0 g of ethylene-1-octene polymer. Its polymerization activity was 962 g.polymer/g.Al.

This ethylene polymer had a melting point (Tm) of 78.7° C. as measured by a differential scanning calorimeter (DSC), a crystallization enthalpy (ΔH) of 40.4 J/g, and an intrinsic viscosity $[\eta]$ of 4.32 dl/g as measured in decalin at 135° C.

The results are shown in Table 6.

EXAMPLE 21 to 28

Polymerization was carried out by the same procedure as in Example 20 except that main catalysts shown in Table 5 were used. The results are shown in Table 6.

EXAMPLE 29

The same procedure as in Example 20 was repeated except that 0.03 mmol of pentamethylcyclopentadienyltitaniumtribenzyl and 0.5 mmol of methylaluminoxane (MAO) were used as main catalysts and a polymerization time was set to 1 hour. The results are shown in Table 6.

TABLE 5

| | Polymerization Conditions | | | |
|---|---|---|---|---|
| | Main Catalyst | | Promotor | Molar Ratio of MAO/Main |
| | Kind | Amount (mmol) | Kind | Amount (mmol) | Catalyst in Terms of Metal |
| Example 20 | Catalyst VI | 0.01 | MAO | 1.0 | 100 |
| Example 21 | Catalyst VII | 0.01 | MAO | 1.0 | 100 |
| Example 22 | Catalyst VIII | 0.01 | MAO | 1.0 | 100 |
| Example 23 | Catalyst IX | 0.01 | MAO | 1.0 | 100 |
| Example 24 | Catalyst X | 0.01 | MAO | 1.0 | 100 |
| Example 25 | Catalyst XI | 0.01 | MAO | 1.0 | 100 |
| Example 26 | Catalyst VII | 0.01 | MAO | 1.0 | 100 |
| Example 27 | Catalyst XIII | 0.01 | MAO | 1.0 | 100 |
| Example 28 | Catalyst XIV | 0.01 | MAO | 1.0 | 100 |
| Example 29 | Catalyst XV | 0.03 | MAO | 0.5 | 17 |

(Notes)
Catalyst VI: Pentamethylcyclopentadienyltitanium tri(cyclohexoxide)
Catalyst VII: Pentamethylcyclopentadienyltitanium monochlorodi(t-butoxide)
Catalyst VIII: Cyclopentadienyltitanium trimethoxide
Catalyst IX: [Tetramethyl, benzyl]cyclopentadienyltitanium trimethoxide
Catalyst X: [Tetramethyl, trimethylsilyl]cyclopentadienyltitanium trimethoxide
Catalyst XI: [Tetramethyl, 4-methoxyphenyl]cyclopentadienyltitanium trimethoxide
Catalyst XII: [Tetramethyl, phenyl]cyclopentadienyltitanium trimethoxide
Catalyst XIII: Pentamethylcyclopentadienyltitaniumdichloro(diphenyl sulfide)
Catalyst XIV: Pentamethylcyclopentadienyltitanium trichloride
Catalyst XV: Pentamethylcyclopentadienyltitanium tribenzyl
Polymerization conditions: Toluene = 400 ml, 1-octene = 20 ml, ethylene pressure = 8.0 kg/cm² · G, temperature = 85° C., polymerization time = 30 minutes in Examples 20 to 28, and 1 hour in Example 29

TABLE 6

| | Yield of Polymer (g) | Polymerization Activity (g · polymer /g · Al) | Comonomer Unit Content | Conversion (%) |
|---|---|---|---|---|
| Example 20 | 26.0 | 962 | 6.9 | 41 |
| Example 21 | 26.8 | 992 | 6.0 | 38 |
| Example 22 | 6.2 | 230 | 9.8 | 13 |
| Example 23 | 14.7 | 544 | 6.2 | 21 |
| Example 24 | 14.8 | 541 | 5.3 | 19 |
| Example 25 | 9.7 | 359 | 6.4 | 15 |
| Example 26 | 20.3 | 752 | 8.4 | 38 |
| Example 27 | 5.5 | 204 | — | — |
| Example 28 | 2.9 | 107 | — | — |
| Example 29 | 3.1 | 229 | 6.2 | 5 |

| | Intrinsic Viscosity (dl/g) | DSC Tm (°C.) | DSC ΔH (J/g) |
|---|---|---|---|
| Example 20 | 4.32 | 78.7 | 40.4 |
| Example 21 | 2.48 | 78.0 | 39.0 |
| Example 22 | 1.95 | 85.8 | 22.5 |
| Example 23 | 2.82 | 84.4 | 38.4 |
| Example 24 | 4.15 | 89.8 | 39.2 |
| Example 25 | 2.75 | 89.0 | 21.5 |
| Example 26 | 2.45 | 84.4 | 34.5 |
| Example 27 | 2.22 | 106.1 | 93.1 |
| Example 28 | 4.22 | 121.7 | 117.7 |
| Example 29 | 5.44 | 90.8 | 68.8 |

Comonomer unit content: (mol %)

EXAMPLE 30

(1) Preparation of methylaluminoxane

In a 500-ml glass container purged with nitrogen were placed 200 ml of toluene and 24 ml (250 mmol) of trimethylaluminum, and 17.8 g (71 mmol) of copper sulfate pentahydrate ($CuSO_4 \cdot 5H_2O$) was divided and then poured into the glass container at room temperature with stirring. Furthermore, reaction was carried out at 40° C. for 10 hours. Afterward, from a solution obtained by the removal of a solid component, toluene was distilled off under reduced pressure at room temperature.

The thus obtained solid residue was subjected to a heat treatment at 130° C. under a reduced pressure of $3 \times 10^{-3}$ Torr to obtain 6.4 g of methylaluminoxane. This product was dispersed in toluene to form a catalytic component.

(2) Preparation of ethylene-1-octene copolymer

Under a nitrogen stream, 390 ml of dehydrated toluene, 10 ml of dehydrated 1-octene and 1 mmol (in terms of an aluminum atom) of methylaluminoxane prepared in the above-mentioned (1) were placed in a 1-liter stainless steel autoclave, and the mixture was then heated up to 65° C. with stirring. The heated mixture was maintained for 5 minutes in this condition, and 10 micromol of pentamethylcyclopentadienyltitanium tri(sec-butoxide) was then added, followed by heating the mixture up to 85° C. in 5 minutes. Afterward, hydrogen was fed under 0.1 kg/cm²G, and ethylene was then continuously fed for 60 minutes under a constant pressure of 6 kg/cm²G. After the completion of polymerization reaction, the pressure was released, and the resulting copolymer was collected by reprecipitation in methanol, and then dried under reduced pressure. The yield of the copolymer was 33.3 g.

(3) Evaluation of ethylene-1-octene copolymer

Physical properties were measured in accordance with procedures described hereinbefore. The same shall apply hereinafter.

(a) Density

The density of the copolymer was 0.918 g/cm³.

(b) Molecular weight distribution

The weight-average molecular weight (Mw) of the copolymer in terms of polyethylene measured by a GPC method was 84,300, and the number-average molecular weight (Mn) of the copolymer was 33,700. Hence, Mw/Mn was 2.50.

(c) Composition distribution

An elution temperature at a peak top on the basis of a composition distribution curve obtained by a temperature rising elution fractionation was 78.5° C., and a half width was 21.0° C. The composition distribution curve is shown in FIG. 1.

(d) Activation energy (Ea) of melt flow

The activation energy (Ea) of melt flow was 9.5 kcal/mol.

(e) Die swell ratio ($D_R$)

The die swell ratio ($D_R$) of the copolymer was 1.65.

EXAMPLE 31

Preparation of ethylene-1-hexene copolymer

Under a nitrogen stream, 390 ml of dehydrated toluene, 10 ml of dehydrated 1-hexene and 1 mmol (in terms of an aluminum atom) of methylaluminoxane prepared in Example 30-(1) were placed in a 1-liter stainless steel autoclave, and the mixture was then heated up to 80° C. with stirring. The heated mixture was maintained for 5 minutes in this condition, and 10 micromol of pentamethylcyclopentadienyltitanium trimethoxide was added and the mixture was then allowed to stand for 30 minutes. Afterward, hydrogen was fed under 0.5 kg/cm$^2$G, and ethylene was then continuously fed for 60 minutes under a constant pressure of 4 kg/cm$^2$G. After the completion of polymerization reaction, the pressure was released, and the resulting copolymer was collected by reprecipitation in methanol, and then dried under reduced pressure. The yield of the copolymer was 30.1 g. The physical properties of this copolymer were evaluated, and the results are shown in Table 7.

EXAMPLE 32

Preparation of ethylene-1-octene-styrene copolymer

The same procedure as in Example 31 was repeated except that dehydrated 1-hexene was replaced with dehydrated 1-octene and 3 ml of styrene was added immediately before the feed of hydrogen, thereby preparing a copolymer. The yield of the copolymer was 25 g. The physical properties of this copolymer were evaluated, and the results are shown in Table 7.

A part of this copolymer was subjected to Soxhlet extraction using methyl ethyl ketone for 5 hours, and from an insoluble material, a hot pressed film was formed. According to infrared absorption spectrum measurement, the stretching vibration of a carbon-carbon double bond attributed to a benzene ring was confirmed at 1602 cm$^{-1}$.

EXAMPLE 33

Preparation of ethylene-1-octene-norbornadiene copolymer

The same procedure as in Example 31 was repeated except that dehydrated 1-hexene was replaced with dehydrated 1-octene and 0.2 mmol of norbornadiene was added immediately before the feed of hydrogen, thereby preparing a copolymer. The yield of the copolymer was 28 g. The physical properties of this copolymer were evaluated, and the results are shown in Table 7.

EXAMPLE 34

Preparation of ethylene-1-octene copolymer

Under a nitrogen stream, 920 ml of dehydrated hexane, 80 ml of dehydrated 1-octene and 2 mmol (in terms of an aluminum atom) of methylaluminoxane prepared in Example 30-(1) were placed in a 2-liter stainless steel autoclave, and the mixture was then heated up to 150° C. with stirring. Afterward, 0.6N liter of hydrogen was added, and ethylene was further fed under a partial pressure of 24 kg/cm$^2$G. Next, 20 micromol of pentamethylcyclopentadienyltitanium tri(isopropoxide) was added, and polymerization was then started. This polymerization was carried out for 10 minutes, while the partial pressure of ethylene was constantly maintained. After the completion of polymerization reaction, the pressure was released, and the resulting copolymer was collected and then dried under reduced pressure. The yield of the copolymer was 28.2 g. The physical properties of this copolymer were evaluated, and the results are shown in Table 7.

Comparative Example 4

(1) Preparation of methylaluminoxane

The same procedure as in Example 30-(1) was repeated except that the treatment conditions of 130° C., 3×10$^{-3}$ Torr and 5 hours in Example 30-(1) were replaced with treatment conditions of 80° C., 2 Torr and 3 hours, thereby preparing methylaluminoxane.

(2) Preparation of ethylene-1-octene copolymer

Figure 2:
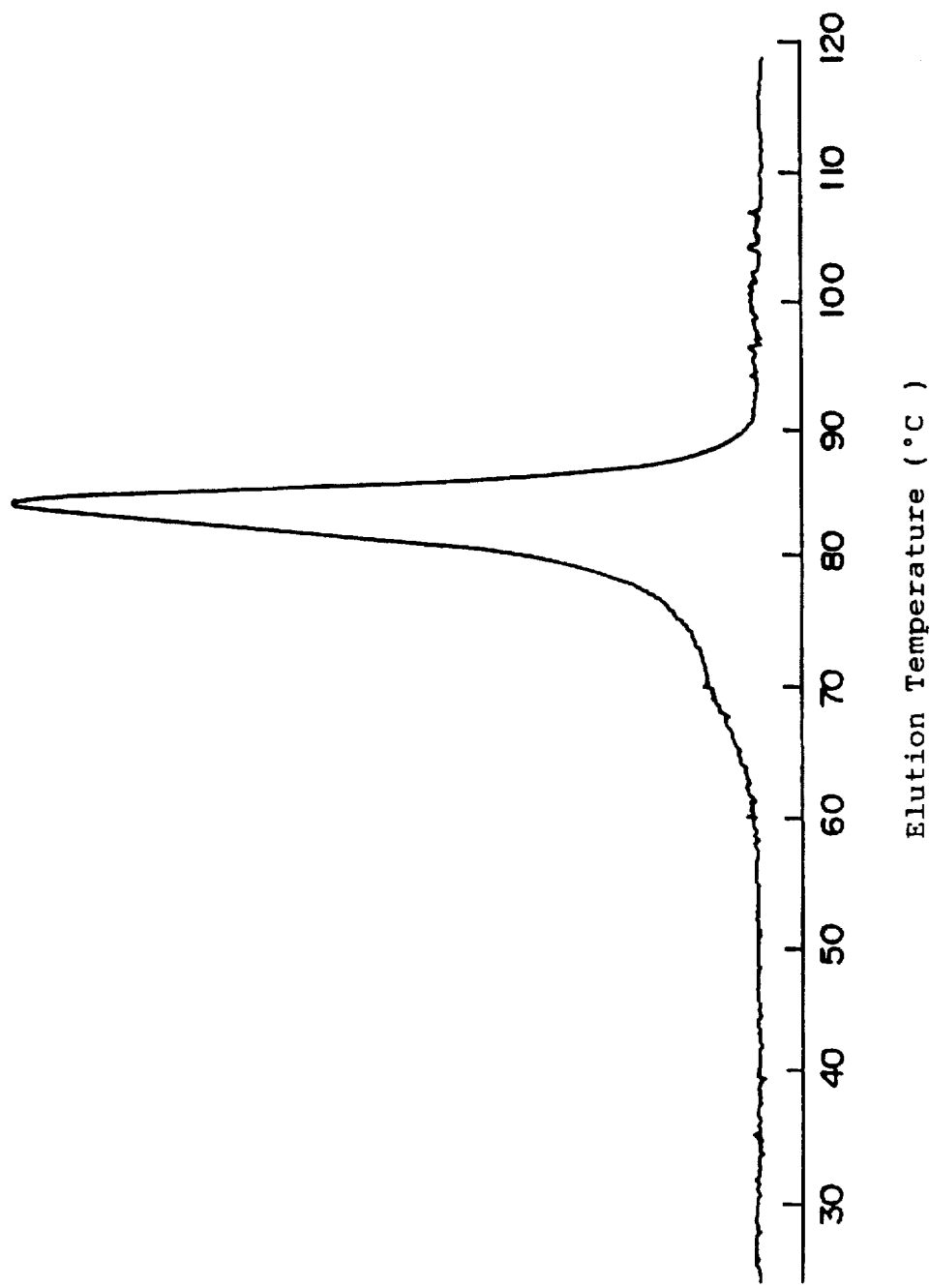
FIG. 2 is a composition distribution curve of an ethylene/1-octene copolymer obtained in Comparative Example 4.

Under a nitrogen stream, 460 ml of dehydrated toluene, 40 ml of dehydrated 1-octene and 6 mmol (in terms of an aluminum atom) of methylaluminoxane prepared in the above-mentioned (1) were placed in a 1-liter stainless steel autoclave, and the mixture was then heated up to 160° C. with stirring. Afterward, ethylene was fed under a partial pressure of 24 kg/cm$^2$G, and 1 micromol of (tertbutylamido) dimethyl(tetramethyl-$\eta^5$-cyclopentadienyl)silanetitanium dichloride was added and polymerization was then started. This polymerization was carried out for 10 minutes, while the partial pressure of ethylene was constantly maintained. After the completion of polymerization reaction, the pressure was released, and the resulting copolymer was collected and then dried under reduced pressure. The yield of the copolymer was 37.7 g. The physical properties of this copolymer were evaluated, and the results are shown in Table 7 and a composition distribution curve is shown in FIG. 2.

Comparative Example 5

The same procedure as in Comparative Example 4 was repeated except that there were employed 360 ml of dehydrated toluene, 0.5 micromol of dicyclopentadienylzirconium dichloride as a titanium catalytic component, 0.75 mmol (in terms of an aluminum atom) of methylaluminoxane and polymerization conditions of an ethylene partial pressure of 8 kg/cm$^2$G, a temperature of 80° C. and a polymerization time of 10 minutes, thereby preparing a copolymer. The yield of the copolymer was 59.9 g. The physical properties of this copolymer were evaluated, and the results are shown in Table 7.

TABLE 7

|  | Density (g/cm$^3$) | Weight-average Molecular Weight [Mw] | Molecular Weight Distribution [Mw/Mn] |
|---|---|---|---|
| Example 30 | 0.918 | 84,800 | 2.5 |
| Example 31 | 0.921 | 99,000 | 3.5 |
| Example 32 | 0.927 | 84,000 | 2.7 |
| Example 33 | 0.919 | 124,000 | 2.9 |
| Example 34 | 0.915 | 98,200 | 2.3 |
| Comp. Ex. 4 | 0.929 | 100,300 | 5.3 |
| Comp. Ex. 5 | 0.925 | 84,200 | 2.4 |

|  | Composition Distribution | | Die Swell Ratio [D$_R$] | Activation |
|---|---|---|---|---|
|  | Elution Temp. at Peak [T] (°C.) | Half Value Width [W] (°C.) |  | Energy (Ea) of Melt Flow (kcal/mol) |
| Example 30 | 78.5 | 21.0 | 1.65 | 9.5 |
| Example 31 | 76.5 | 16.5 | 1.52 | 10.5 |
| Example 32 | 78.0 | 16.0 | 1.50 | 11.5 |
| Example 33 | 78.0 | 15.0 | 1.84 | 12.7 |
| Example 34 | 80.2 | 16.1 | 1.45 | 9.8 |
| Comp. Ex. 4 | 83.0 | 4.5 | 1.06 | 7.5 |
| Comp. Ex. 5 | 73.0 | 8.0 | 1.02 | 7.2 |

EXAMPLE 35

By the use of Laboplasto Mill (internal volume=30 cc) made by Toyo Seiki Co., Ltd., 8 g of ethylene-1-octene copolymer obtained in Example 30 was kneaded with 19 g of ethylene-1-octene copolymer (trade name Moretic 0398CN) made by Idemitsu Petrochemical Co., Ltd. at a temperature of 170° C. at a rotational frequency of 50 rpm for 7 minutes to prepare a resin composition. The die swell ratio ($D_R$) of the resin composition was 1.23.

EXAMPLE 36

By the same procedure as in Example 30, 8 g of ethylene-1-octene copolymer obtained in Example 30 was kneaded with 19 g of ethylene-1-octene copolymer obtained in Comparative Example 5 to prepare a resin composition. The die swell ratio ($D_R$) of this resin composition was 1.20.

Possibility of Industrial Utilization

According to the present invention, even if a small amount of an expensive aluminum compound as a promotor is used, a polymer of an olefin can be prepared by the use of a polymerization catalyst having a high activity, and owing to the decrease in the amount of the catalyst to be used and the improvement of the activity, the remaining catalyst in the polymer can remarkably be decreased, whereby a deashing step and a washing step can be omitted and the influence of the remaining catalyst on a product quality can be reduced. Furthermore, when copolymerization is carried out, the conversion of a comonomer is high owing to the excellent copolymerizability of the catalyst, and hence, after the completion of the polymerization, the collection of the comonomer component is unnecessary or the comonomer can be removed in a simple manner, which is extremely advantageous for the design of a process.

Furthermore, an ethylenic polymer of the present invention is a homopolymer of ethylene or a copolymer of ethylene and another olefin or a polymerizable unsaturated compound, and the polymer is characterized by having a narrow molecular weight distribution, good mechanical properties (such as tearing strength), good heat-sealing properties, a good ESCR, a wide composition distribution, high melt flow properties and an excellent molding stability (swell ratio).

The ethylenic polymer of the present invention can suitably be used in a molding/working field (blowing, inflation, sheeting or lamination) of polyethylene in which good extrusion/working properties are required, or a resin composition field [the improvement of working properties of linear low-density polyethylene (L-LDPE), or the like].

We claim:

1. A process for preparing an olefin polymer which comprises the step of:

homopolymerizing an olefin or copolymerizing two different olefins or an olefin and another polymerizable unsaturated compound in the presence of a polymerization catalyst containing (A) a transition metal compound represented by the formula (I):

$$CpML_{x-1} \quad (I)$$

wherein M is a metallic element of Groups 3 to 10 of the Periodic Table or a metallic element of the lanthanide series; Cp is a cyclic compound group having a cyclopentadienyl skeleton of 5 to 30 carbon atoms; L is R', OR', SR', SO$_3$R', N'R'R", PR'R", wherein R' and R" are each a $C_{1-20}$ hydrocarbon group or a silyl group, NO$_2$, a halogen atom, a 1-pyrrolyl group or a 1-pyrrolidinyl group, with the proviso that at least one of the L groups is OR', SR', N'R'R" or PR'R", wherein R' and R" are each a $C_{1-20}$ hydrocarbon group or a silyl group; and x is a valence number of M, and when a plurality of L's are present, the respective L's may be the same or different, and (B) an aluminoxane, wherein the molar ratio of the component (B)/component (A) (in terms of the metallic atoms) is in the range of 2 to 500.

2. The process for preparing an olefin polymer according to claim 1 wherein the component (B) is mainly an alkylaluminoxane.

3. The process for preparing an olefin polymer according to claim 1 wherein the polymer catalyst is at least one of said transition metal compound and said aluminoxane compound supported on a solid carrier which is insoluble in a hydrocarbon solvent.

4. The process for preparing an olefin polymer according to claim 1, wherein Cp is cyclopentadienyl, substituted cyclopentadienyl, indenyl, substituted indenyl, fluorenyl or substituted fluorenyl.

5. A process for preparing an olefin polymer which comprises the step of:

homopolymerizing an olefin or copolymerizing two different olefins or an olefin and another polymerizable unsaturated compound in the presence of a polymerization catalyst consisting essentially of (A) a transition metal compound represented by the formula (I):

$$CpML_{x-1} \quad (I)$$

wherein M is a metallic element of Groups 3 to 10 of the Periodic Table or a metallic element of the lanthanide series; Cp is a cyclic compound group having a cyclopentadienyl skeleton of 5 to 30 carbon atoms; L is R', OR', SR', SO$_3$R', N'R'R", PR'R", wherein R' and R" are each a $C_{1-20}$ hydrocarbon group or a silyl group, NO$_2$, a halogen atom, a 1-pyrrolyl group or a 1-pyrrolidinyl group, with the proviso that at least one of the L groups is OR', SR', N'R'R" or PR'R", wherein R' and R" are each a $C_{1-20}$ hydrocarbon group or a silyl group; and x is a valence number of M, and when a plurality of L's are present, the respective L's may be the same or different, and (B) an aluminoxane, wherein the molar ratio of the component (B)/component (A) (in terms of the metallic atoms) is in the range of 2 to 500.

6. An ethylenic polymer prepared by the process of claim 1.

7. An ethylenic polymer prepared by the process of claim 2.

8. An ethylenic polymer prepared by the process of claim 3.

9. An ethylenic polymer which comprises a homopolymer of ethylene or a copolymer of ethylene and at least one member selected from the group consisting of other olefins and polymerizable unsaturated compounds, wherein, in said ethylenic polymer, (i) the ratio Mw/Mn of a weight-average molecular weight (Mw) to a number-average molecular weight (Mn) in terms of a polyethylene measured by a gel permeation chromatography is within the range of 1.5 to 4, the weight-average molecular weight (Mw) being within the range of 3,000 to 1,000,000; (ii) the relation between the half value width of the main peak of a composition distribution curve obtained by temperature rising elution fractionation and temperature position of the main peak meeting the equation $W \geq -24.9 + 2470/T$, (iii) the activation energy (Ea) of melt flow is within the range of 7.5 to 20 kcal/mol, and (iv) the resin density (d) is within the range of 0.85 to 0.97 g/cm$^3$.

10. The ethylenic polymer according to claim 9, wherein at least one member selected from the group consisting of other olefins and polymerizable unsaturated compounds is at least one member selected from the group consisting of α-olefins having 3 to 20 carbon atoms, aromatic vinyl compounds, cyclic olefins and diolefins.

11. The ethylenic polymer according to claim 9, wherein at least one member selected from the group consisting of other olefins and polymerizable unsaturated compounds is at least one member selected from the group consisting of α-olefins having 3 to 20 carbon atoms and diolefins, and the relation between weight-average molecular weight (Mw) and die swell ratio ($D_R$) meets the equation $D_R > 0.50 + 0.125 \times \log Mw$.

\* \* \* \* \*

UNITED STATES PATENT AND TRADEMARK OFFICE
CERTIFICATE OF CORRECTION

PATENT NO.  : 5,739,225
DATED       : April 14, 1998
INVENTOR(S) : Toshinori TAZAKI et al It is certified that error appears in the above-identified patent and that said Letters Patent is hereby corrected as shown below:

Column 16, line 20, "$30 \geq T \geq b99$." should read --$30 \leq T \leq 99$.--

Signed and Sealed this

Nineteenth Day of January, 1999

Attest:

Attesting Officer

*Acting Commissioner of Patents and Trademarks*